(12) United States Patent
Teng et al.

(10) Patent No.: US 8,681,867 B2
(45) Date of Patent: Mar. 25, 2014

(54) SELECTIVE DEBLOCK FILTERING TECHNIQUES FOR VIDEO CODING BASED ON MOTION COMPENSATION RESULTING IN A CODED BLOCK PATTERN VALUE

(75) Inventors: Chia-Yuan Teng, San Diego, CA (US); Sharath Manjunath, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1617 days.

(21) Appl. No.: 11/350,666

(22) Filed: Feb. 8, 2006

(65) Prior Publication Data

US 2011/0110427 A1    May 12, 2011

Related U.S. Application Data

(60) Provisional application No. 60/728,361, filed on Oct. 18, 2005.

(51) Int. Cl.
*H04N 11/02* (2006.01)

(52) U.S. Cl.
USPC .................................................. 375/240.16

(58) Field of Classification Search
USPC ........................................ 375/240.01–240.29
See application file for complete search history.

(56) References Cited

U.S. PATENT DOCUMENTS

| 5,173,773 | A  | * | 12/1992 | Ueda et al. | 375/240.18 |
| 5,892,518 | A  | * | 4/1999 | Mizobata et al. | 345/474 |
| 2005/0053145 | A1 | * | 3/2005 | Hsu et al. | 375/240.16 |
| 2005/0175091 | A1 | * | 8/2005 | Puri et al. | 375/240.03 |
| 2006/0251174 | A1 | * | 11/2006 | Caviedes et al. | 375/240.24 |

FOREIGN PATENT DOCUMENTS

JP    2005020771 A    1/2005

OTHER PUBLICATIONS

Srinivasean S et al, "Windows Media Video 9: overview and applications." Signal Processing. Image Communication Elsevier Science Publishers, Amsterdam, NL, vol. 19, No. 9, Oct. 2004, pp. 851-875.
Xiaoyan Sun et al, "In-loop dfblocking filtfr for block-based video coding" Signal Processing, 2002 6th International Conference on Aug. 26-30, 2002, Piscataway, NJ, USA, IEEE, vol. 1, Aug. 26, 2002, pp. 33-36.
Puri A et al, "Video coding using the H.264/MPEG-4 AVC compression standard" Signal Processing. Image Communication, elsevier Science Publishers, Amsterdam, NL, vol. 19, No. 9, Oct. 2004, pp. 793-849.
Srinivasan S, Signal Processing: Image Communication, NL, Elsevier Science Publishers, Oct. 2004, V19 N9, pp. 851-875.

(Continued)

*Primary Examiner* — Leron Beck
(74) *Attorney, Agent, or Firm* — Timothy F. Loomis; Brent Boyd

(57) ABSTRACT

This disclosure describes selective deblock filtering techniques that are particularly useful with coding standards that do not specify in-loop deblock filtering for standard compliance. In accordance with this disclosure, deblock filtering may be selectively performed with respect to block boundaries of a given video block being coded, a motion compensation process can be performed using a filtered version of the prediction video frame used to code the given video block, or both. This disclosure also provides selection rules that can be applied to determine what type of deblocking techniques to apply in various scenarios. The selection rules may improve the video coding and may also ensure that mismatch between video blocks at an encoder and a decoder is not introduced by the deblock filtering.

31 Claims, 5 Drawing Sheets

(56) References Cited

OTHER PUBLICATIONS

Translation of Office Action in Japan application 2008-536779 corresponding to U.S. App. No. 11/350,666, citing Srinivasan_S_Signal_Processing_pp._851_875_year_2004 and JP2005020771 dated Feb. 22, 2011.

"Windows Media Video 9: overview and applications".
Xiaoyan Sun et al: "In-loop deblocking filter for block-based video coding" Signal Processing, 2002 6th International Conference•on Aug. 26-30, 2002, Piscataway, NJ, USA, IEEE, vol. 1, Aug. 26, 2002, pp. 33-36, XP010627917.
International Search Report and Written Opinion—PCT/US2006/040761—ISA/EPO-Mar. 23, 2007.

* cited by examiner

SELECTIVE DEBLOCK FILTERING TECHNIQUES FOR VIDEO CODING BASED ON MOTION COMPENSATION RESULTING IN A CODED BLOCK PATTERN VALUE

RELATED APPLICATIONS

This application claims the benefit of provisional U.S. Application Ser. No. 60/728,361, entitled "SELECTIVE MC-DB: A DEBLOCKING POST-FILTER BASED ON MOTION COMPENSATION," filed Oct. 18, 2005, assigned to the assignee of the present application, and incorporated herein by reference in its entirety for all purposes.

TECHNICAL FIELD

This disclosure relates to digital video processing and, more particularly, filtering techniques that can reduce blockiness artifacts in coded video frames.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, direct two-way communication devices (sometimes referred to as "walkie-talkies"), and the like. Digital video devices can provide significant improvements over conventional analog video systems in creating, modifying, transmitting, storing, recording and playing full motion video sequences.

A number of different video coding standards have been established for coding digital video sequences. The Moving Picture Experts Group (MPEG), for example, has developed a number of standards including MPEG-1, MPEG-2 and MPEG-4. Other standards include the International Telecommunications Union (ITU) H.263 standards, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU H.264 standards and a number of proprietary standards.

Many video coding standards allow for improved transmission rates of video sequences by coding data in a compressed fashion. Compression can reduce the overall amount of data that needs to be transmitted for effective transmission of video frames. Most video coding standards, for example, utilize graphics and video compression techniques designed to facilitate video and image transmission over a narrower bandwidth than can be achieved without compression. Many of the MPEG standards and the ITU H.263 and ITU H.264 standards, for example, support video coding techniques that utilize similarities between successive video frames, referred to as temporal or inter-frame correlation, to provide inter-frame compression. Such inter-frame compression is typically achieved via motion estimation and motion compensation coding techniques. In addition, some video coding techniques utilize similarities within frames, referred to as spatial or intra-frame correlation, to compress the video frames. Intra-frame compression is typically achieved via spatial estimation and intra-prediction coding techniques.

The use of discrete video blocks in inter-frame and/or intra-frame compression can cause artifacts in the video sequence between adjacent video blocks. In particular, when a video frame is divided into video blocks for video coding, the edge of one coded video block may appear discontinuous with the adjacent edge of another coded video block. When this occurs, the decoded video frame may appear "blocky," which is highly undesirable. Transforms and quantization of video blocks can compound this undesirable blockiness effect in coded video frames.

In order to remove such "blockiness," filtering can be performed on the block boundaries of the video blocks to "smooth" the transitions between adjacent video blocks. Deblocking filters generally refer to filters that are used to smooth the transitions between adjacent video blocks to reduce or eliminate blockiness artifacts. The ITU-T H.264 standard, for example, requires a deblocking filter as part of the in-loop coding. In this case, when filtering is part of the in-loop video coding, the previously coded frames used in motion estimation and motion compensation are filtered versions of such frames. For other standards that do not mandate a deblocking filter as part of the coding loop, post deblock filtering may still improve the quality of the video coding by removing blockiness artifacts after the coding is performed.

SUMMARY

This disclosure describes deblock filtering techniques that address both originated blockiness and inherited blockiness that can manifest as a result of prediction-based video coding. Originated blockiness refers to the blockiness introduced by poor texture coding. Originated blockiness occurs at the video block boundaries of a coded video frame. Inherited blockiness, on the other hand, refers to the blockiness that can be inherited from the prediction video frame that is used by the prediction-based video coding techniques in order to code a current video block. Inherited blockiness can occur at any location in the coded video frame, and is not restricted to block boundaries. Therefore, traditional deblock filtering applied around block boundaries may not remove inherited blockiness.

This disclosure provides for selective deblock filtering, which is particularly useful with coding standards that do not specify in-loop deblock filtering for standard compliance, such as MPEG-4 and ITU H.263 P0 (profile 0 of the ITU H.263 standard). In this case, post filtering can be applied in a manner that accounts for originated blockiness and inherited blockiness. In particular, deblock filtering may be selectively performed with respect to block boundaries of a given video block being coded, a motion compensation process can be performed using a filtered version of the prediction video frame used to code the given video block, or both. This disclosure also provides selection rules that can be applied to determine what type of deblocking techniques to apply in various scenarios. The selection rules can ensure that mismatch between video blocks at an encoder and a decoder is not introduced by the filtering.

In one embodiment, this disclosure provides a video coding device comprising a video coding unit that codes frames of a video sequence using prediction-based coding techniques on video blocks of the frames, and a deblock filtering unit. The prediction-based coding techniques, for example, may include a motion compensation process that uses a non-filtered version of a prediction frame in order to provide motion-based coding. The deblock filtering unit (a) deblock filters a block boundary of a given video block if the given video block is texture coded; (b) performs a motion compensation process using a filtered version of a prediction video frame used to code the given video block if the given video block is not texture coded, a neighbor video block to the given video block is not texture coded, and the given video block and the neighbor video block have substantially similar motion vectors; and (c) deblock filters the block boundary of the given video block and performs the motion compensation process using the filter version of the prediction video frame if neither (a) nor (b) is satisfied.

In another embodiment, this disclosure provides a method comprising: (a) coding frames of a video sequence using prediction-based coding techniques on video blocks of the frames; (b) deblock filtering a block boundary of a given video block if the given video block is texture coded; (c) performing a motion compensation process using a filtered version of a prediction video frame used to code the given video block if the given video block is not texture coded, a neighbor video block to the given video block is not texture coded, and the given video block and the neighbor video block have substantially similar motion vectors; and (d) deblock filtering the block boundary of the given video block and performing the motion compensation process using the filter version of the prediction video frame if neither (b) nor (c) is satisfied.

In another embodiment, this disclosure provides a deblock filtering unit for video coding. In this case, the deblock filtering unit (a) deblock filters a block boundary of a given video block if the given video block is texture coded; (b) performs a motion compensation process using a filtered version of a prediction video frame used to code the given video block if the given video block is not texture coded, a neighbor video block to the given video block is not texture coded, and the given video block and the neighbor video block have substantially similar motion vectors; and (c) deblock filters the block boundary of the given video block and performs the motion compensation process using the filter version of the prediction video frame if neither (a) nor (b) is satisfied.

In another embodiment, this disclosure provides a computer readable medium comprising instructions that upon execution during a video coding process: (a) deblock filter a block boundary of a given video block if the given video block is texture coded; (b) perform a motion compensation process using a filtered version of a prediction video frame used to code the given video block if the given video block is not texture coded, a neighbor video block to the given video block is not texture coded, and the given video block and the neighbor video block have substantially similar motion vectors; and (c) deblock filter the block boundary of the given video block and perform the motion compensation process using the filter version of the prediction video frame if neither (a) nor (b) is satisfied.

In another embodiment, this disclosure provides a video coding device comprising means for coding frames of a video sequence using prediction-based coding techniques on video blocks of the frames; means for deblock filtering a block boundary of a given video block if the given video block is texture coded; means for performing a motion compensation process using a filtered version of a prediction video frame used to code the given video block if the given video block is not texture coded, a neighbor video block to the given video block is not texture coded, and the given video block and the neighbor video block have substantially similar motion vectors; and means for deblock filtering the block boundary of the given video block and performing the motion compensation process using the filter version of the prediction video frame if the video block is not texture coded and one or more of the following conditions are satisfied: the neighbor video block to the given video block is texture coded, and the given video block and the neighbor video block have substantially different motion vectors.

In another embodiment, this disclosure provides a video coding device comprising a video coding unit that codes frames of a video sequence using prediction-based coding techniques on video blocks of the frames. In this case, the video coding unit performs deblock filtering including: (a) deblock filtering a block boundary of a given video block if the given video block is texture coded; (b) performing a motion compensation process using a filtered version of a prediction video frame used to code the given video block if the given video block is not texture coded, a neighbor video block to the given video block is not texture coded, and the given video block and the neighbor video block have substantially similar motion vectors; and (c) deblock filtering the block boundary of the given video block and performing the motion compensation process using the filter version of the prediction video frame if neither (a) nor (b) is satisfied.

In an added embodiment, this disclosure contemplates the techniques herein implemented with respect to intra-prediction coding rather than motion based coding. In this case, a method may comprise: (a) deblock filtering a block boundary of a given video block if the given video block is texture coded; (b) performing an intra prediction process using a filtered version of a reference frame used to code the given video block if the given video block is not texture coded, a neighbor video block to the given video block is not texture coded, and the given video block and the neighbor video block have substantially similar motion vectors; and (c) deblock filtering the block boundary of the given video block and performing the spatial estimation process using the filter version of the prediction video frame if neither (a) nor (b) is satisfied. Devices and/or deblocking filters that implement this added technique are also contemplated.

These and other techniques and embodiments described herein may be implemented in a digital video device in hardware, software, firmware, or any combination thereof. If implemented in software, the software may be executed in a digital signal processor (DSP). In that case, the software that executes the techniques may be initially stored in a computer readable medium and loaded and executed in the DSP for effective deblock filtering in a digital video device. Implementations using hardware, one or more processors, or combinations of hardware, software, firmware and processors are also contemplated.

Additional details of various embodiments are set forth in the accompanying drawings and the description below. Other features, objects and advantages will become apparent from the description and drawings, and from the claims.

DETAILED DESCRIPTION

This disclosure describes selective deblock filtering techniques that are particularly useful with coding standards that do not specify in-loop deblock filtering for standard compliance, such as MPEG-4 and ITU H.263 P0. In accordance with this disclosure, deblock filtering may be selectively performed with respect to block boundaries of a given video block being coded, a motion compensation process can be performed using a filtered version of the prediction video frame used to code the given video block, or both. This disclosure also provides selection rules that can be applied to determine what type of deblocking techniques to apply in various scenarios. The selection rules may improve the video coding and may also ensure that mismatch between video blocks at an encoder and a decoder is not introduced by the filtering.

The described techniques can account for both originated blockiness and inherited blockiness that can manifest as a result of prediction-based video coding. Originated blockiness refers to the blockiness introduced by poor texture coding. Originated blockiness occurs at the video block boundaries of a coded video frame. Inherited blockiness, on the other hand, refers to the blockiness that can be inherited from the prediction video frame used by the prediction-based video coding. The prediction video frame refers to the reference frame used to perform the coding, and for motion-based coding, is typically a previous (or subsequent) frame to a current frame of a video sequence being coded. In any case, inherited blockiness can occur at any location in the coded video frame, and is not restricted to block boundaries.

Figure 1:
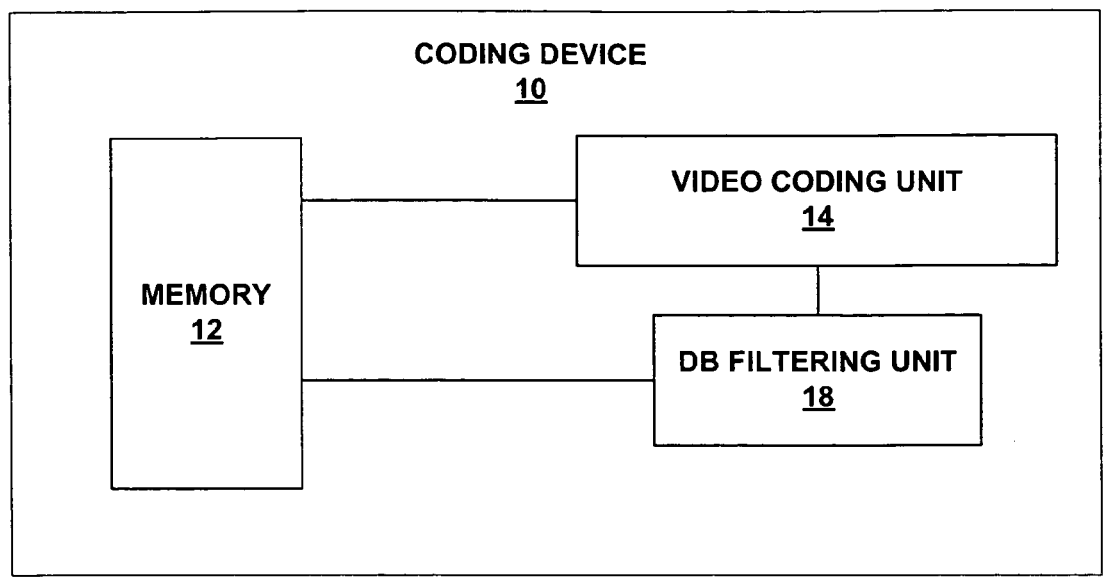
FIG. 1 is an exemplary block diagram of a video coding device according to an embodiment of this disclosure.

FIG. 1 is a block diagram of a video coding device 10 according to this disclosure. Coding device 10 may comprise any of a wide variety of devices that can be used to encode or decode video sequences. Examples of coding device 10 generally include any computer, such as a server, a workstation or any other desktop computing device, or a mobile computing device such as a laptop computer or a personal digital assistant (PDA). Other examples include digital television broadcasting satellites and receiving devices such as digital televisions, digital cameras, digital video cameras or other digital recording devices. Still other examples include digital video telephones such as mobile telephones having video capabilities, direct two-way communication devices with video capabilities, other wireless video devices, and the like. The techniques may be particularly useful for small hand-held devices in which size and battery consumption are more relevant insofar as the techniques may reduce filtering complexity.

Coding device 10 includes a memory 12, which may comprise any volatile or non-volatile storage elements. Memory 12 generally stores video sequences, e.g., during the encoding and decoding process. In some cases, memory 12 may include both on-chip and off-chip memory. For example, memory 12 may include a relatively large off-chip memory space that stores a video sequence, and a smaller and faster local on-chip memory used in the coding process. In that case, the off-chip memory may comprise dynamic random access memory (DRAM), or FLASH memory, and a local on-chip memory may comprise synchronous random access memory (SRAM). For simplicity, however, a single memory 12 is illustrated to represent any number of memory elements that can be used to facilitate video coding.

In the example shown in FIG. 1, coding device 10 includes a video coding unit 14 and a deblock (DB) filtering unit 18. Although these components are illustrated separately, in some cases, deblock filtering functionality may be integrated into the video coding unit. In general, coding unit 14 performs prediction-based coding techniques, such as inter-frame coding via motion estimation and motion compensation techniques, or intra-frame coding via spatial estimation and intra-prediction techniques.

Coding unit 14 may be referred to as a "CODEC," but generally refers to an encoder, a decoder, or an integrated encoder/decoder. The techniques described herein are most applicable to decoding, but may also apply during encoding particularly if decoding techniques are used as part of the encoding steps. Coding device 14 may be implemented within hardware, software, firmware, one or more digital signal processors (DSPs), microprocessors, application specific integrated circuits (ASICs), field programmable gate arrays (FPGAs), discrete hardware components, or various combinations thereof.

Deblocking unit 18 performs selective deblock filtering according to the techniques of this disclosure. In particular, deblocking unit 18 selectively performs deblock filtering with respect to block boundaries of a given video block being coded, performs an additional motion compensation process using a filtered version of the prediction video frame used to code the given video block, or both. Selection criteria applied by deblocking unit 18 determine the level and extent of deblock filtering in a manner that accounts for originated blockiness and inherited blockiness. The techniques can allow deblock filtering of block boundaries, but may avoid such filtering in the motion compensation process in cases where such filtering could introduce a mismatch between blocks used in encoding and blocks used in decoding. In other words, for blocks that are texture coded, motion compensation using filtered versions of the prediction blocks can introduce mismatch. Thus, for blocks that are texture coded, motion compensation may use non filtered-versions of the prediction blocks Various architectures are also described, which can simplify implementation of the techniques of this disclosure. In most cases, coding device 10 may include many other components, which are not illustrated in FIG. 1 for simplicity. These additional components, for example, may include transmitters and receivers to send and receive the video sequences, video capture devices, such as digital cameras, to capture the video sequences, or any other component commonly used in a device that codes video.

Most of the popularly used video coding technologies, such as ITU H.264/AVC, ITU H.263, ITU H.261, MPEG-1, MPEG-2, MPEG-4, Windows Media Video 9.0 (WMV9) and Real Video 9.0 (RV9), exploit block-based transform and scalar quantization as a basis of texture coding. Although the block based texture coding is a relatively simple and effective scheme to compress video, one drawback of texture coding is the manifestation of blocking artifacts. Blocking artifacts, also referred to as blockiness, are especially noticeable when coarse quantization is used to code the video content, which is typical for video transmission at low bit-rates.

As noted above, blockiness can be classified into two types: originated blockiness and inherited blockiness. The originated blockiness is generally the blockiness introduced by poor texture coding. It is more severe when the video blocks are coded with higher quantization parameters. Such originated blockiness occurs at pixels around the block boundaries and has the same length as the block size (e.g., 8 pixels for MPEG-4). Since it is visible around the block boundaries, a low pass filter applied on those areas is usually sufficient to resolve the problem.

On the other hand, inherited blockiness is the blocking artifact inherited from the reference frame for inter-predicted (or intra-predicted) video blocks. In other words, inherited blockiness is blockiness that is originally in the reference video block identified within the reference frame by the prediction-based coding. Since this reference video block is used to construct the coded block, and is typically identified by a motion vector, the blockiness of the reference video block can be inherited by a current video block that is coded using the reference. Inherited blockiness artifacts may be visible at any location and are not restricted to block boundaries. In addition, inherited blockiness can have any length (e.g., not just 8 pixels for MPEG-4). The traditional deblocking filter applied around block boundaries will typically not remove such inherited blockiness.

Inherited blockiness is less of a problem in video coding systems that support in-loop deblock filtering. In this case, filtered frames are used as reference frames for the prediction based coding. Therefore, in such systems, inherited blockiness is generally removed, at least to a large extent, because the reference frame has already been deblock filtered. After motion compensation, texture coding can even further reduce the difference between the predicted (motion compensated) block and the original block, which can help to reduce inherited blockiness even more. Without texture coding, however, blockiness from the reference frame will be directly passed on to blocks of an encoded frame.

For ITU H.264 and ITU H.263 P3 (Profile 3 of the ITU H.263 standard), which support in-loop deblocking filter, inherited blockiness may not be a significant problem because blockiness in the reference frame is generally reduced to acceptable levels by the in-loop deblock filtering. On the other hand, inherited blockiness is a more significant problem when a in-loop deblocking filtering is not exploited, e.g., in MPEG-4 and ITU H.263 P0. In this case, since the reference frame used in decoding the current frame is the reference frame before deblock filtering is applied, if there is not sufficient texture coding (e.g., when the quantization parameter is high) in the current frame, the blockiness in the reference frame will be passed on to the current frame. One focus of this disclosure is a description of a post deblocking filter solution that can resolve the inherited blockiness problem for MPEG4 and ITU H.263 P0.

The severity of inherited blockiness may depend on the block types (coded block pattern and motion vectors) and the type of deblocking filter used (in-loop or post-loop). Inherited blockiness of four different block types and two different filter types (loop filter and post filter) is shown in Table 1.

TABLE 1

| Block type | Loop filter | Post filter | Location of the inherited blockiness |
| --- | --- | --- | --- |
| mv = 0, cbp = 0 | < | = | On the block boundary |
| mv ≠ 0, cbp = 0 | < | = | Not on the block boundary |
| mv = 0, cbp ≠ 0 | <– | – | On the block boundary |
| mv ≠ 0, cbp ≠ 0 | <– | – | Not on the block boundary |

In Table 1, "cbp" stands for coded block pattern and "mv" stands for motion vector. When cbp=0, there is no texture coding and vice versa. The symbol "=" denotes that the blockiness in reference frame is completely passed on to the current block. The symbol '<' denotes that the blockiness inherited from reference frame is reduced because of in-loop behavior. The symbol '–' denotes that the blockiness inherited from the reference frame is further reduced because of texture coding. Notably, inherited blockiness is the most severe when cbp=0 and post-loop filter is used. This disclosure proposes a solution referred to as Selective Motion Compensation based De-Blocking (SMCDB) in order to remove inherited blockiness, particularly for those blocks with cbp=0. When cbp≠0 (cbp not equal to 0), indicating that texture coding was used for the video block, motion compensation based on a filtered reference frame may be avoided so that mismatch is not introduced between video blocks at the encoder and the decoder.

Since in-loop deblock filtering reduces inherited blockiness, one solution to remove the blocking artifacts is to replace the unfiltered reference frame with the filtered one at the decoder. However, this can introduce mismatch problems between the encoder and the decoder because the encoder uses non-filtered frames as reference frames while the decoder uses the filtered frames as reference frames. The mismatch problem may also become more severe due to error propagation until the next "intra" frame arrives.

Another approach is to apply a deblocking filter on all pixel locations, instead of only applying deblock filtering on block boundaries. Since blockiness inherited from the reference frame can appear anywhere, application of deblock filtering to all locations can remove inherited blockiness in many cases. This technique, however, is overly complex from an implementation standpoint, and often causes blurred images due to over-filtering.

Yet another solution is based on history tracking. Inherited blockiness typically originates from an I-frame (intra-coded frame) and is passed from one frame to the next through temporal prediction. By tracking the movement of each block (hence the blockiness) and applying a deblocking filter at the locations where inherited blockiness resides, the problem of inherited blockiness can be resolved. For example, this technique tracks the movement of blockiness using motion vectors, records the types of deblocking filters used in the past, and then applies the same type of deblocking filter used in the reference frames at the locations known to have inherited blockiness.

For example, suppose x denotes the blockiness in reference frame, and MC(x) is the blockiness inherited from the reference frame. The history tracking technique first determines the location of MC(x), and then applies the same deblocking as the previous frame on MC(x). The process can be described as x->MC(x)->DB(MC(x)). Note that the texture coding is not considered here, insofar as this technique only deals with the case of cbp=0.

It can become very complicated, however, to track all the movement behaviors of all the blocks. A more simple alternative is to exchange the order of motion compensation (MC) and deblocking (DB) in the process, from x->MC(x)->DB(MC(x)) to x->DB(x)->MC(DB(x)). The new order means that motion compensation is performed using the filtered frames as the reference frame for blocks with cbp=0. Again, this only applies to blocks with no texture coding. For blocks with texture coding (cbp≠0), this technique can introduce mismatch problems between the encoder and the decoder. Accordingly, this technique may be specifically avoided when cbp≠0.

After MC(DB(x)) is performed on the current block with cbp=0, if a neighbor block to the current block is not a motion compensated block, or if the neighbor block has a different motion vector, another round of deblocking can be applied in between the current block and its neighbor block to prevent possible blockiness generated between the motion compensated block and its neighbor block. This algorithm, referred to herein as Selective Motion Compensation based De-Blocking (SMCDB), applies (1) DB (2) MC or (3) DB after MC on a block. The choice is based on cbp and neighbor block's properties, as described in greater detail below.

In the notation used in this disclosure, it should be noted that DB refers to deblock filtering of the block boundaries of a current video block being coded. MC refers to an additional motion compensation process, which applied a filtered version of the prediction video frame used to code the current video block. This filtered version of the prediction video frame may be stored when it is encoded, specifically for use in this additional motion compensation process. The original motion compensation process used in the coding prior to post-loop deblock filtering, however, may use the non-filtered version of the prediction frame.

In general, the techniques of this disclosure may follow three basic steps:
(1) If cbp=1 for the current video block (the block has texture coding), use deblock filtering on the current video block.
(2) If cbp=0 for the current video block, and cbp=0 for neighbors to the current video block, and the neighbor's motion vectors are the same as the current block's motion vectors: use MC2 (explained below).
(3) Otherwise: use both MC2 and DB.

In order to differentiate the motion compensation (MC) used by the regular decoder and the post-loop deblocker, two different symbols are used in this disclosure: MC1 and MC2. MC1 is the MC for the decoder, in which the reference frame used is the decoded frame before deblocking filter, i.e., a non-filtered frame. MC2 is the MC for deblock filtering unit, where the reference frame used is the reference frame after application of the deblocking filter, i.e., a filtered frame. At the time of coding of the reference frame, its filtered version may be stored or cached for possible later use in an MC2 process.

Figure 2:
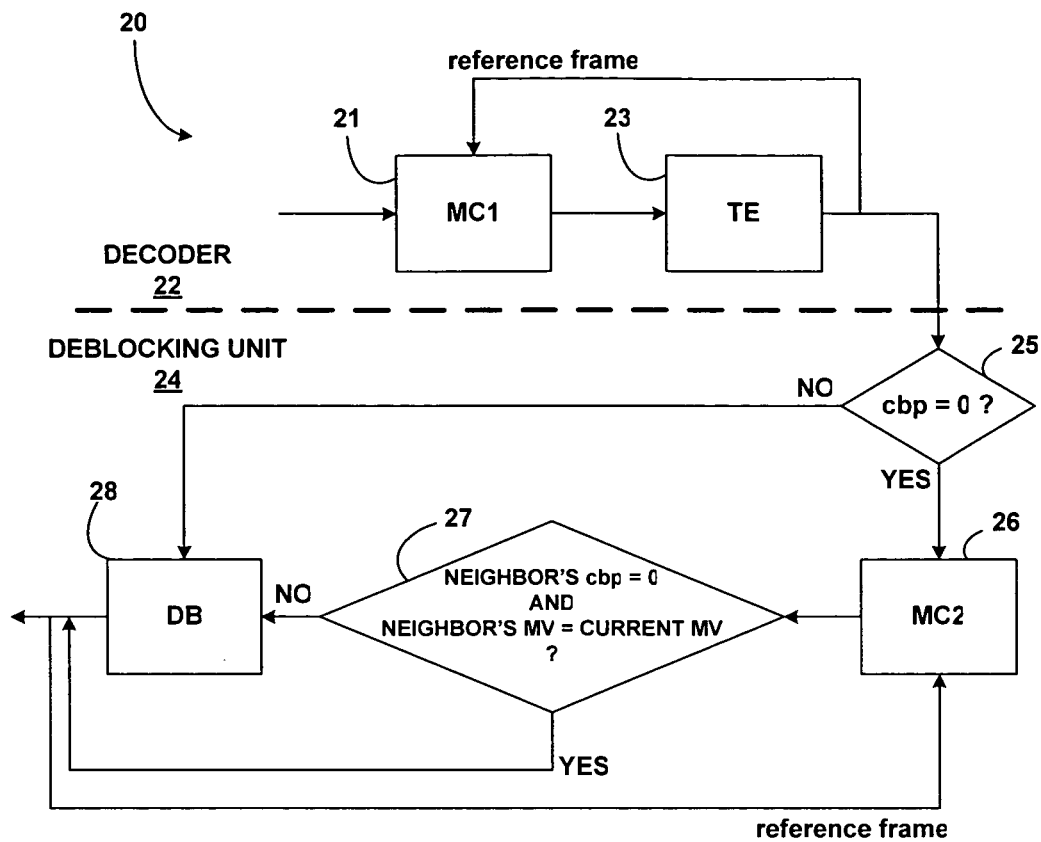
FIG. 2 is a flow diagram illustrating an exemplary architecture of a video decoder unit and a deblocking unit according to one embodiment of this disclosure.
Figure 3:
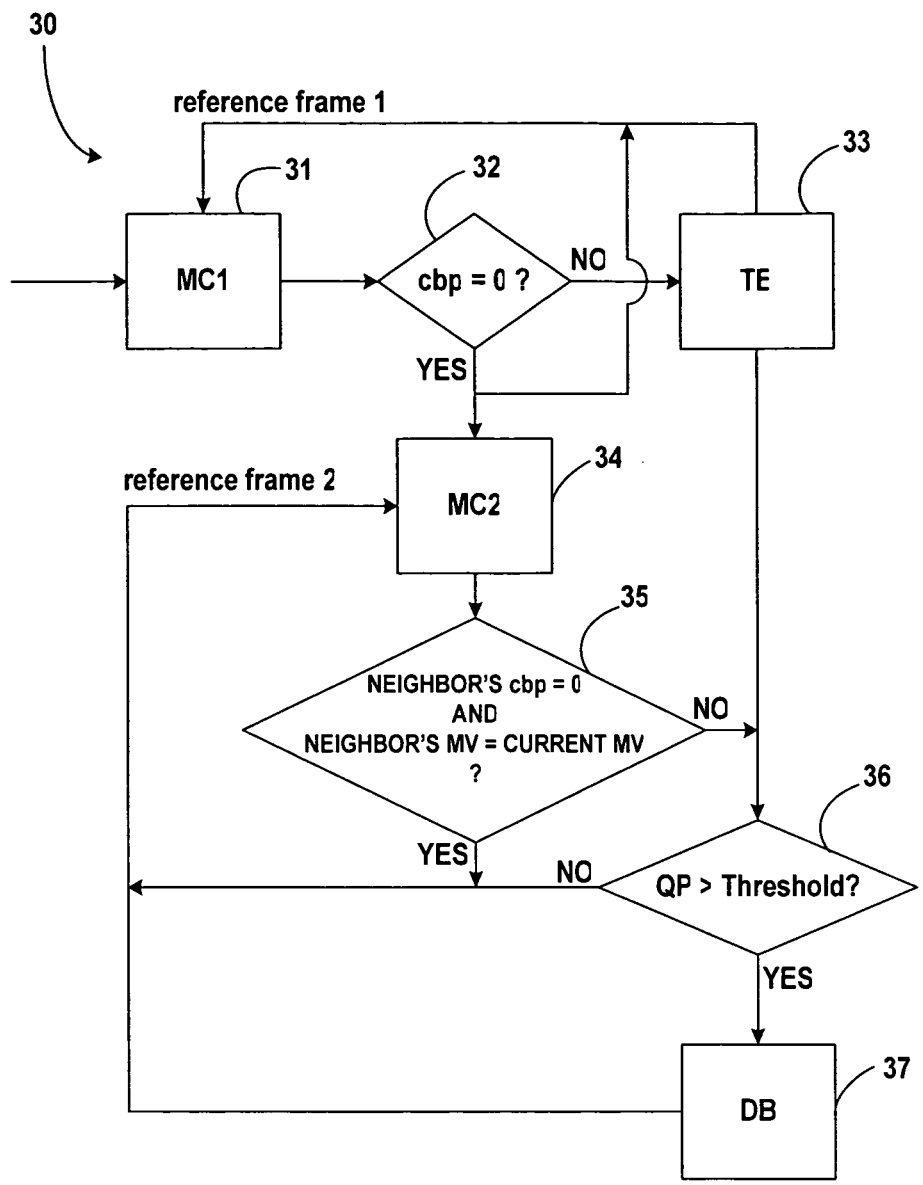
FIG. 3 is a flow diagram illustrating an exemplary architecture of a video decoder unit that includes integrated deblocking functionality according to one embodiment of this disclosure.

FIG. 2 is a diagram illustrating one architecture that may be used to implement SMCDB. The architecture of FIG. 2 may be particularly useful for devices with limited power and limited processing cycles that can be allocated to the deblocking process. For chips or devices with enough power and processing overhead, it may be more useful to integrate the deblock filtering techniques into the decoder, such as shown in the example of FIG. 3.

As shown in FIG. 2, device 20 includes a decoder 22 and a deblocking unit 24. Decoder 22 includes a motion compensator (MC1) 21 that performs a first motion compensation process, and also includes a texture engine (TE) 23 that performs texture coding. For example, TE 23 may perform a discrete cosign transform (DCT) process or another texture coding process used for video coding.

In order to support improved deblock filtering, deblocking unit 24 is used. Deblocking unit 24 may perform post-loop deblock filtering in accordance with this disclosure. As shown in FIG. 2, deblocking unit 24 makes a determination of whether cbp=0 (as shown by 25). If so (yes branch of 25), deblocking unit 22 implements motion compensator (MC2) 26 to perform a second motion compensation process. Importantly, the motion compensation process performed by MC2 26 applied a filtered version of the reference frame, which may have been stored in a memory. If the reference frame has filtered block boundaries, however, inherited blockiness can be introduced in decoded frames.

If deblocking unit 24 makes a determination of that cbp=0 (yes branch of 25), then following MC2 26, it makes another determination (shown in 27) of whether a neighbor to the current video block being coded has a cbp=0 and a motion vector that is equal to (substantially similar to) the motion vector of the current video block. If both of these two criteria are met, the deblock filtering 28 is avoided for the block boundaries of the current video block.

If cbp≠0 (no branch of 25), or if either of the criteria of determination 27 are not met, deblocking unit 24 implements deblocking filtering 28 to deblock filter block boundaries of the current video block. These determinations and filtering illustrated in FIG. 2 may also be made with respect to a plurality of block boundaries and a plurality of neighbors to the current video block being coded.

Generally, FIG. 2 illustrates one architecture in which a separate deblocking filter is used with a decoding unit. The deblocking filter may perform the following steps:
(1) If the current video block is texture coded, deblock filtering is applied with respect to the boundaries of the current video block.
(2) If the current video block is not texture coded, neighbors to the current video block are not texture coded and, motion vectors associated with the neighbors are the same as or substantially similar to the motion vector associated with the current block, a motion compensation process is implemented using a filtered version of the prediction frame used in the prediction-based coding.
(3) Otherwise, both the motion compensation process using the filtered version of the prediction frame and deblock filtering with respect to the boundaries of the current video block are used.

FIG. 3 is another diagram illustrating an architecture that may be used to implement SMCDB. The architecture of FIG. 3 also performs the three steps described in the preceding paragraph. Unlike device 20 of FIG. 2, however, device 30 of FIG. 3 integrates the decoding functionality with the deblock filtering described herein.

As shown in FIG. 3, an integrated decoder of device 30 includes a motion compensator (MC1) 31 that performs a first motion compensation process, and a texture engine (TE) 33 that performs texture coding. Decision (32) determines whether texture coding is to be performed based on whether cbp=0. If not (no branch of 32), TE 33 performs texture coding, and if the quantization parameter (QP) associated with the current video block is greater than a threshold (yes branch of 36), a deblocking filter 37 performs deblock filtering with respect to block boundaries of the current video block. It should be noted that the QP threshold determination (shown in 36) may be added to any of the embodiments described herein.

If cbp=0 (yes branch of 32), motion compensator (MC2) 34 is implemented. Like the other examples herein, MC2 34 performs its motion compensation process using a filtered version of the prediction video frame used in the prediction-based encoding. Again, the filtered versions of the prediction video frame may have been stored after it was deblock filtered previously, e.g., in the previous coding of the prediction video frame. Device 30 makes a determination (shown in 35) of whether a video block that neighbors the current video block being coded has a cbp=0 and a motion vector that is equal to (or substantially similar to) the motion vector of the current video block. If either of these two criteria are not met, device 30 implements deblocking filter 37 if the QP associated with the current video block is greater than a threshold (yes branch of 36). However, if either of these criteria are met, deblock filtering on the block boundaries of the current video block is avoided, as this could otherwise introduce over-smoothing of the video content.

It should be noted that while the diagrams of FIGS. 2 and 3 apply with respect to motion based coding, similar techniques may also be used with respect to intra-coded frames. In this case, the motion compensation processes may be replaced with intra-prediction processes, as use in intra-based prediction coding. The prediction frame (for intra coding) is the same frame that includes the current frame being coded.

The techniques described herein may also be implemented in conjunction with one or more existing deblocking filters of a coding device. Thus, if a given coding device already implements a deblocking filter, the techniques of this disclosure may be made "backwards compatible" with the existing deblocking filter.

More generally, SMCDB may work with any deblocking filter. For example, if an H.264 deblocking filter were implemented in hardware, SMCDB combined with a H.264 deblocking filter could be used. An H.264 deblocking filter originally designed as an in-loop filter for an H.264 CODEC could be modified slightly and used as a post filter for MPEG4 and ITU H.263 P0.

Figure 4:
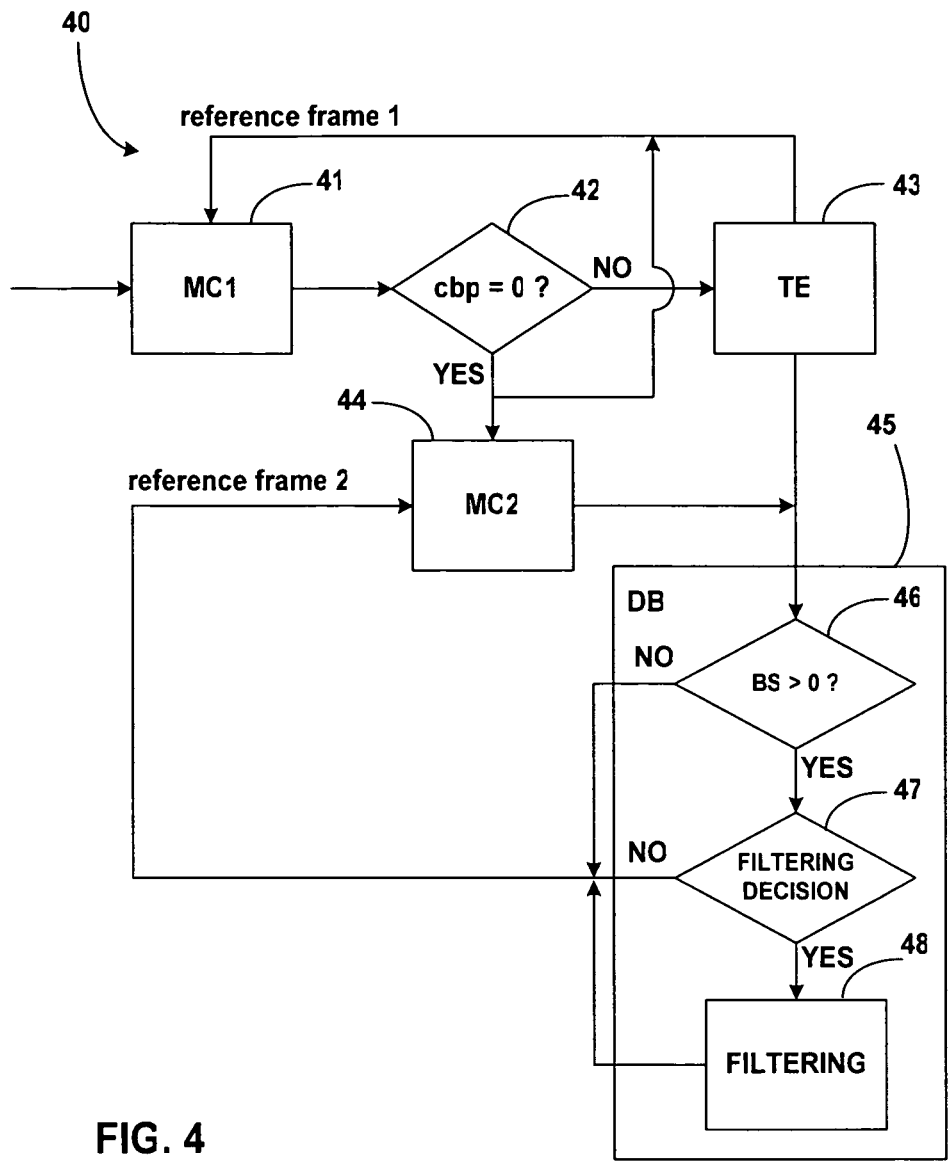
FIG. 4 is a flow diagram illustrating an exemplary architecture of a video decoder unit that includes deblocking functionality using an ITU H.264 deblocking filter.

In accordance with this disclosure, FIG. 4 illustrates an architecture of SMCDB combined with H264 deblocking, where the decision on whether to perform deblocking after MC2 (as in FIGS. 2 and 3) is replaced by the boundary strength determination of the H.264 deblocking filter.

As shown in FIG. 4, coding device 40 includes a motion compensator (MC1) 41 that performs a first motion compensation process using a non-filtered version of the prediction video frame, and a texture engine (TE) 43 that performs texture coding. Decision (42) determines whether texture coding is to be performed based on whether cbp=0. If cbp=0 (yes branch of 42), motion compensator (MC2) 44 performs a motion compensator process that uses a filtered version of the prediction video frame. If cbp≈0 (no branch of 42), texture engine 43 performs texture coding, and a deblocking filter unit 45 is used to determine whether and to what extent the block boundaries of the current video block should be deblock filtered.

In the example of FIG. 4, deblock filtering unit 45 makes a boundary strength determination (46) and a filtering decision (47). In some cases, these determinations could be implemented using an existing ITU H.264 deblocking filter as a post filter. In this case, the deblock filtering unit 45 may access an in-loop deblocking filter, but use the filter as a post deblocking filter. Deblock filtering unit 48 may include lookup tables to perform any input parameter adjustments needed to effectively use the ITU H.264 filter, yet comply with another standard such as MPEG-4.

The techniques of this disclosure however, are not limited to use with any particular standard, and may find wide application with a number of standards and existing or newly implemented filtering units. In general, in FIG. 4, deblock filtering (shown in 48) is performed based on the results of the boundary strength determination (46) and the filtering decision (47), but the determination and decision may be defined according to one of several possible coding standards.

If desired, a threshold QP determination could also be invoked prior to implementing deblock filtering unit 45. In this case, deblock filtering unit 45 would be invoked only if (in addition to the contingencies outlined above), the quantization parameter associated with the current video block is also greater than a threshold. In other words, deblock filtering may be avoided if the QP is low enough to ensure highly accurate encoding of the video blocks of a frame.

In addition to the techniques described above, a number of additional techniques may be applied in various scenarios in order to further reduce complexity of the implementation. In one example, deblock filtering may be disabled/enabled depending on the QP used for a given video block and the distance of the current video block to the last I-frame. Experiments have shown that when coded with the same QP, an I-frame tends to be more blocky than a P-frame (predictive frame), and that a P-frame closer to the last I-frame tends to be more blocky than a P-frame farther away from the last I-frame. That is, blockiness tends to decrease as the distance to the last I-frame increases. Moreover, as expected, for a frame with fixed distance to the last I-frame, blockiness is more severe as the frame QP increases. These observations apply at the video block level as well as the frame level.

Based on these observations, a video block-level deblock filtering decision can be made based on QP and distance to the last I-frame in order to reduce complexity of the implementation. For example, deblock filtering may be disabled for a video block when QP is less than a threshold "th," where the "th" is a function of d, and d is the distance from current video block to the last I-frame. This deblocking decision serves as a gate to by-pass unnecessary deblock filtering, and can thereby reduce implementation complexity. The decision can also be designed to be implemented in an ad-hoc way or could be more efficiently implemented by a complexity-quality cost function.

Another complexity reduction could be achieved by performing deblock filtering (and decisions thereof) with respect to luminance blocks only, and not with respect to chrominance blocks. In other words, deblock filtering can be disabled for "chroma" blocks. Since blocking artifacts are more visible in luminance than chrominance, avoiding chroma deblock filtering may not degrade quality in an excessive manner. Experiments have shown little or no visible quality loss when chroma DB is disabled.

Yet another complexity reduction could be achieved by disabling deblock filtering after MC2 (as described herein). In the architectures of FIGS. 2 and 3, deblock filtering is applied after MC2 for blocks with cbp=0 that have different properties from its neighbor or neighbors. Turning off such filtering after MC2 could reduce system complexity even further, but may reduce the quality of the deblocking.

For implementations that make use of an existing ITU H.264 deblocking filter, complexity could also be reduced by disabling strong filtering (associated with boundary strength (BS) of 4). The BS=4 filter defined for ITU H.264 is much more complex than the filters associated with others BS values. The complexity can be greatly reduced when the BS=4 strong filter defined by ITU H.264 is replaced by the BS=3 filter defined by ITU H.264, which results in very small quality degradation.

In still other implementations, MC2 may be disabled when it is not needed. Since the reason to use MC2 in the SMCDB scheme is to remove inherited blockiness, MC2 should be disabled when inherited blockiness is no longer an issue. The number of non-coded blocks, the number of intra video blocks and the average QP in a frame are all influencing factors when deciding the severity of inherited blockiness. As an example, MC2 may be disabled if the number of non-coded blocks is less than a threshold and the average QP is smaller than a threshold. In this case, MC2 may be re-enabled if MC2 is currently disabled, but the number of the intra video blocks is greater than a threshold.

In order to verify the quality of the techniques proposed herein, the following two test video clips were used in experiments: "skin" and "cities." A blocking artifact value (BAV) was used to measure the severity of blockiness. In the simulations, each video clip was coded with MPEG-4 at 48 kilobits per second (kbps) and 15 frames per second (fps). In terms of deblocking performance (reduction in blockiness), all SMCDB configurations outperformed H.264 deblock filtering. In terms of complexity (processing cycle usage), even the most complicated SMCDB configuration (no simplification used) consumed less processing cycles than the ITU H.264 deblock filtering techniques.

Figure 5:
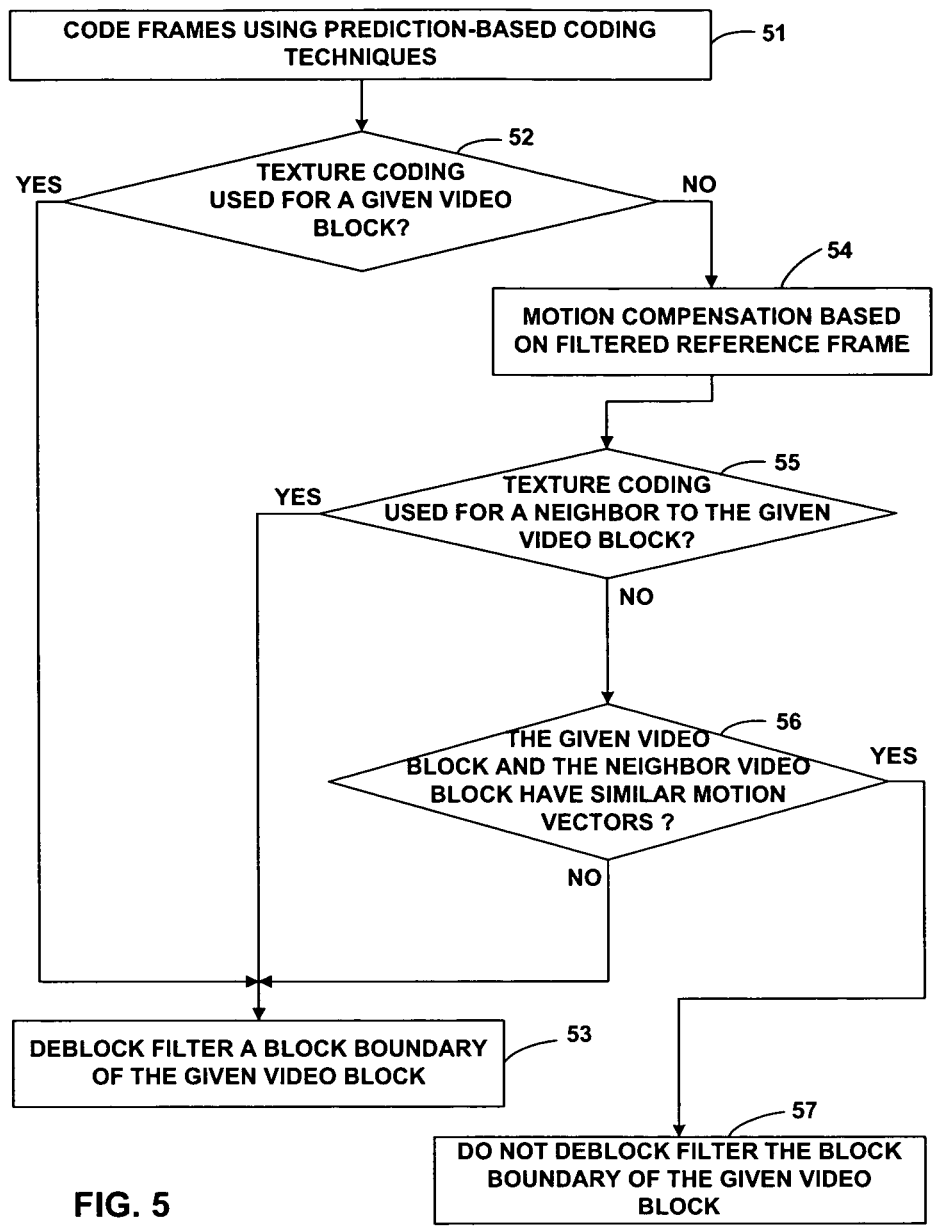
FIG. 5 is a flowchart illustrating a deblocking technique consistent with this disclosure.

FIG. 5 is a flowchart illustrating a deblocking technique consistent with this disclosure. FIG. 5 will be described in the context of device 10 of FIG. 1, although the techniques could be implemented by a device that integrated a DB filtering unit (like unit 18 of FIG. 1) directly into video coding unit, in which case the deblock filtering techniques would be performed by the coding unit.

As shown in FIG. 5, coding unit 14 codes video frames in memory 12 using prediction-based coding techniques (51). Prediction-based coding techniques refer to any coding techniques in which blocks of video frames are compared to other blocks for the coding. Examples of prediction-based coding techniques includes inter-frame compression based motion estimation and motion compensation, or intra-frame correlation based on spatial estimation and intra-prediction. The prediction based coding (51) may use non-filtered versions of prediction video frames, e.g., in the motion compensation.

DB filtering unit 18 determines whether texture coding was used for a given video block (52). If so (yes branch of 52), DB filtering unit 18 filters a block boundary of the given video block (53). If not (no branch of 52), DB filtering unit 18 performs a new motion compensation process based on a filtered reference frame (i.e., a filtered prediction frame) (54).

Following the motion compensation process using the filtered reference frame (54), DB filtering unit 18 determines whether texture coding was used for a neighbor to the given video block (55), and whether the given video block and the neighbor video block have similar motion vectors (56). If texture coding was not used for a given video block (no branch of 52), but used for a neighbor to the given video block (yes branch of 55), then DB filtering unit 18 deblock filters a block boundary of the given video block (53). Also, if texture coding was not used for a given video block (no branch of 52) and a neighbor to the given video block (no branch of 55), and the given video block and the neighbor video block do not have similar motion vectors (no branch of 56), then DB filtering unit 18 deblock filters a block boundary of the given video block (53). However, if texture coding was not used for a given video block (no branch of 52) and a neighbor to the given video block (no branch of 55), but the given video block and the neighbor video block do have similar motion vectors, DB filtering unit 18 avoids any deblock filtering of the block boundary of the given video block (57).

The technique illustrated in FIG. 5 is illustrated for simplicity with respect to the filtering of one block boundary of the given video block. Of course, this disclosure further contemplates the filtering techniques being applied with respect to several block boundaries of the given video block. Thus, the techniques of this disclosure may include (d) deblock filtering a plurality of block boundaries of the given video block if the given video block is texture coded; (e) performing the motion compensation process using the filtered version of the prediction video frame used to code the given video block if the given video block is not texture coded, a plurality of neighbor video blocks to the given video block are not texture coded, and the given video block and the neighbor video blocks have substantially similar motion vectors; and (f) deblock filtering the plurality of block boundaries of the given video block and performing the motion compensation process using the filter version of the prediction video frame if neither (d) nor (e) is satisfied.

A number of embodiments have been described. However, various modifications could be made to the techniques described herein. For example, although the techniques have been described in the context of inter-prediction based coding, similar techniques may also apply in the context of intra-prediction based coding. In other words, the prediction video frame may be a previous or subsequent frame in a video sequence to a current frame being encoded, or (in the case of intra-coding) may be the same frame that includes the current video block being coded. These and other variations of the techniques described herein are contemplated by this disclosure.

The techniques described herein may be implemented in hardware, software, firmware, or any combination thereof. If implemented in software, the techniques may be directed to a computer readable medium comprising program code, that when executed in a device that codes video sequences, performs one or more of the deblock filtering techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the deblock filtering techniques. In some cases, the techniques may be executed by a DSP that invokes various hardware components to accelerate the coding process. In other cases, the units described herein may be implemented as a microprocessor, one or more application specific integrated circuits (ASICs), one or more field programmable gate arrays (FPGAs), or some other hardware-software combination. The deblock filter units described herein may comprise hardware filters, or possibly a filter implemented in software or firmware. These and other embodiments are within the scope of the following claims.

The invention claimed is:

1. A video coding device comprising:
a video coding unit configured to:
perform a first motion compensation process on a current video block using a prediction video frame;
determine whether the first motion compensation process results in a coded block pattern value of zero for the current video block;
only when the first motion compensation process results in the coded block pattern value of zero for the current video block, perform a second motion compensation process using a filtered version of the prediction video frame used to code the current video block; and
only when the first motion compensation process does not result in the coded block pattern value of zero for the current video block, not perform the second motion compensation process.

2. The video coding device of claim 1, wherein the video coding device complies with a coding standard that does not specify in-loop deblock filtering for standard compliance.

3. The video coding device of claim 2, wherein the coding standard comprises one of a Moving Picture Experts Group 4 (MPEG-4) standard and an International Telecommunications Union (ITU) H.263 P0 standard.

4. The video coding device of claim 1, wherein the video coding device comprises at least one of a digital television, a wireless communication device, a personal digital assistant, a laptop computer, a desktop computer, a digital camera, a digital recording device, a cellular radiotelephone with video capabilities, a satellite radiotelephone with video capabilities, and a direct two-way communication device with video capabilities.

5. The video coding device of claim 1, further comprising a deblock filtering unit configured to disable deblock filtering with respect to one of the frames of a video sequence based at least in part on a quantization parameter associated with the one of the frames being less than a threshold.

6. The video coding device of claim 5, wherein the deblock filtering unit enables deblock filtering with respect to luminance video blocks and disables deblock filtering with respect to chrominance video blocks.

7. The video coding device of claim 1, wherein the first motion compensation process includes a motion compensation process using a non-filtered version of the prediction video frame.

8. A method comprising:
performing, by a video coding device, a first motion compensation process on a current video block using a prediction video frame;
determining, by the video coding device, whether the first motion compensation process results in a coded block pattern value of zero for the current video block;
only when the first motion compensation process results in the coded block pattern value of zero for the current video block, performing, by the video coding device, a second motion compensation process using a filtered version of the prediction video frame; and
only when the first motion compensation process does not result in the coded block pattern value of zero for the current video block, not performing the second motion compensation process.

9. The method of claim 8, further comprising coding, by the video coding device, frames of a video sequence according to a coding standard that does not specify in-loop deblock filtering for standard compliance.

10. The method of claim 9, wherein the coding standard comprises one of a Moving Picture Experts Group 4 (MPEG-4) standard and an International Telecommunications Union (ITU) H.263 P0 standard.

11. The method of claim 8, further comprising disabling, by the video coding device, deblock filtering with respect to one of the frames of the video sequence based at least in part on a quantization parameter associated with the one of the frames being less than a threshold.

12. The method of claim 8, further comprising performing, by the video coding device, deblock filtering with respect to luminance video blocks and disabling deblock filtering with respect to chrominance video blocks.

13. The method of claim 8, wherein the first motion compensation process includes a motion compensation process using a non-filtered version of the prediction video frame.

14. A deblock filtering unit for video coding, wherein the deblock filtering unit:
determines whether a first motion compensation process performed on a current video block results in a coded block pattern value of zero for the current video block;
only when the first motion compensation process results in the coded block pattern value of zero for the current video block, performs a second motion compensation process using a filtered version of a prediction video frame used to code the current video block; and
only when the first motion compensation process does not result in the coded block pattern value of zero for the current video block, does not perform the second motion compensation process.

15. The deblock filtering unit of claim 14, wherein the deblock filtering unit comprises software instructions executed in a processor.

16. The deblock filtering unit of claim 14, wherein the first motion compensation process includes a motion compensation process using a non-filtered version of the prediction video frame.

17. A non-transitory computer readable medium comprising instructions that upon execution during a video coding process:
perform a first motion compensation process on a current video block using a prediction video frame;
determine whether the first motion compensation process results in a coded block pattern value of zero for the current video block; and
only when the first motion compensation process results in the coded block pattern value of zero for the current video block, perform a second motion compensation process using a filtered version of the prediction video frame used to code the current video block; and
only when the first motion compensation process does not result in the coded block pattern value of zero for the current video block, not perform the second motion compensation process.

18. A video coding device comprising:
means for performing a first motion compensation process on a current video block using a prediction video frame;
means for determining whether the first motion compensation process results in a coded block pattern value of zero for the current video block; and
means for performing, only when the first motion compensation process results in the coded block pattern value of zero for the current video block, a second motion compensation process using a filtered version of the prediction video frame used to code the current video block and not perform the second motion compensation process only when the first motion compensation process does not result in the coded block pattern value of zero for the current video block.

19. The video coding device of claim 1, wherein the video coding unit is further configured to:
determine whether to apply a deblocking filter following the second motion compensation process based at least in part on a value of a coded block pattern associated with a neighbor video block to the current video block and whether the current video block and the neighbor video block have equal motion vectors.

20. The video coding device of claim 19, wherein the video coding unit is further configured to:
apply the deblocking filter following the first motion compensation process and not perform the second motion compensation process based on the determination whether the first motion compensation process results in a coded block pattern value of zero for the current video block.

21. The method of claim 8, further comprising:
determining, by the video coding device, whether to apply a deblocking filter following the second motion compensation process based at least in part on a value of a coded block pattern associated with a neighbor video block to the current video block and whether the current video block and the neighbor video block have equal motion vectors.

22. The method of claim 21, further comprising:
applying, by the video coding device, the deblocking filter following the first motion compensation process and not performing the second motion compensation process based on the determination whether the first motion compensation process results in a coded block pattern value of zero for the current video block.

23. The deblock filtering unit of claim 14, wherein the deblock filtering unit further:
determines whether to apply a deblocking filter following the second motion compensation process based at least in part on a value of a coded block pattern associated with a neighbor video block to the current video block and whether the current video block and the neighbor video block have equal motion vectors.

24. The deblock filtering unit of claim 23, wherein the deblock filtering unit further:
applies the deblocking filter following the first motion compensation process and does not perform the second motion compensation process based on the determination whether the first motion compensation process results in a coded block pattern value of zero for the current video block.

25. A computer readable medium of claim 17, further comprising instructions that upon execution during a video coding process:
determine whether to apply a deblocking filter following the second motion compensation process based at least in part on a value of a coded block pattern associated with a neighbor video block to the current video block and whether the current video block and the neighbor video block have equal motion vectors.

26. A computer readable medium of claim 25, further comprising instructions that upon execution during a video coding process:
apply the deblocking filter following the first motion compensation process and not perform the second motion compensation process based on the determination whether the first motion compensation process results in a coded block pattern value of zero for the current video block.

27. The device of claim 18, further comprising:
means for determining whether to apply a deblocking filter following the second motion compensation process based at least in part on a value of a coded block pattern associated with a neighbor video block to the current video block and whether the current video block and the neighbor video block have equal motion vectors.

28. The device of claim 27, further comprising:
means for applying the deblocking filter following the first motion compensation process and not performing the second motion compensation process based on the determination whether the first motion compensation process results in a coded block pattern value of zero for the current video block.

29. The video coding device of claim 1, wherein the video coding unit is further configured to:
only when the first motion compensation process results in the coded block pattern value of zero for the current video block, determine a coded block pattern value of a neighbor video block, the neighbor video block being positioned adjacent to the current video block.

30. The video coding device of claim 29, wherein the video coding unit is further configured to:
only when the first motion compensation process results in the coded block pattern value of zero for the current video block, determine whether a motion vector associated with the current video block is equal to a motion vector associated with the neighbor video block.

31. The video coding device of claim 30,
wherein the current video block comprises one or more block boundaries with respect to the neighbor video block, and
wherein the video coding unit is further configured to:
only when the coded block pattern of the neighbor video block is equal to zero and the motion vector associated with the current video block is equal to the motion vector associated with the neighbor video block, not perform deblock filtering with respect to any of the one or more block boundaries.

* * * * *